United States Patent Office 3,451,492
Patented June 24, 1969

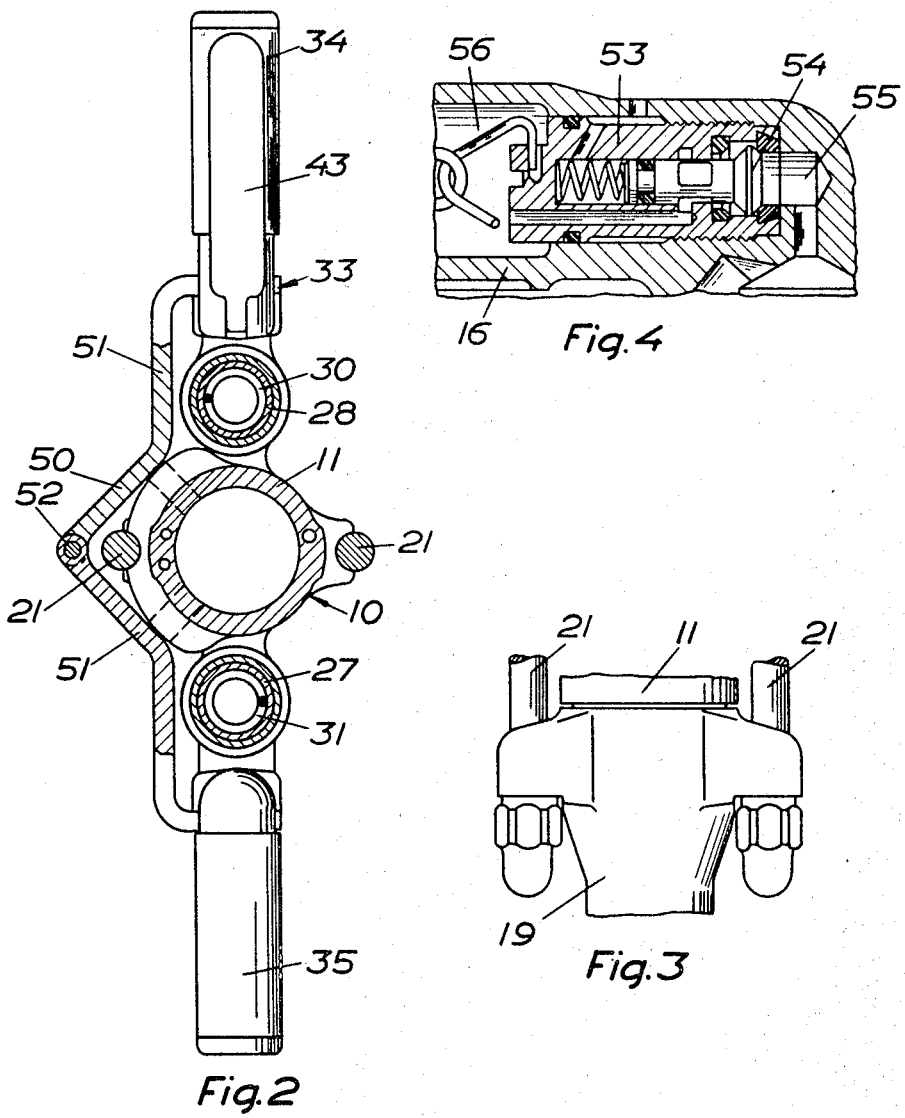

---

3,451,492
RECOIL VIBRATION DAMPED PERCUSSIVE MACHINE
Gösta Ivar Ekström and Jarl Joel Blomberg, Nacka, Sweden, assignors to Atlas Copco Aktiebolag, Nacka, Sweden, a corporation of Sweden
Filed Nov. 28, 1967, Ser. No. 686,035
Claims priority, application Sweden, Nov. 29, 1966, 16,284/66
Int. Cl. E21c 1/00; E21b 3/00, 1/00
U.S. Cl. 173—162                    10 Claims

ABSTRACT OF THE DISCLOSURE

In a recoil vibration damped percussive machine a handle portion for sustaining the machine in position is fixed to an intermediate portion of at least one tube axially slidably guided at its opposite ends in bores in the machine, a recoil damping spring being inserted between the interior of each said tube and one of the bores for being loaded during work by forward movement of the handle portion relative to the machine.

---

Figure 1:
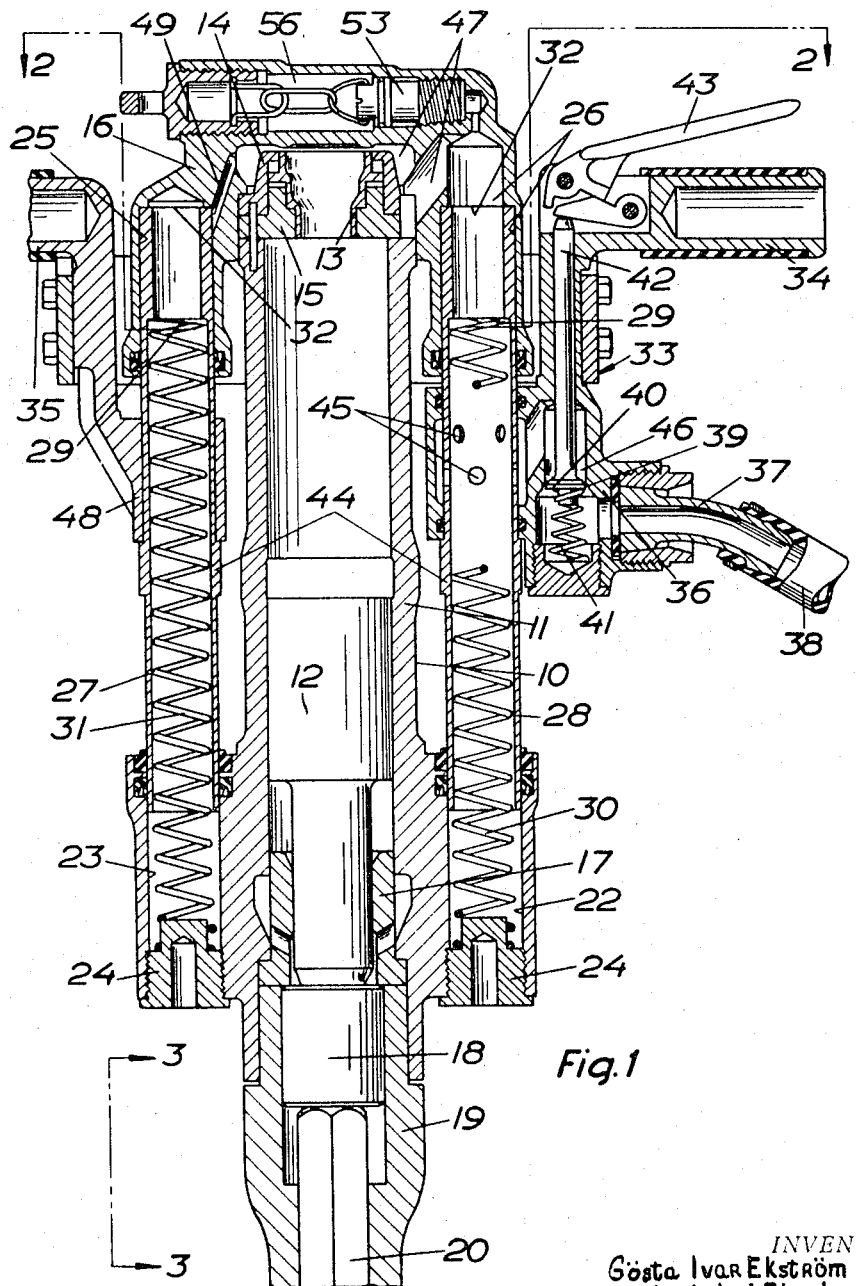

This invention relates to a recoil vibration damped percussive machine of the type having an impact motor, a handle portion axially movably guided on the machine for sustaining the machine in position during work, and at least one recoil damping spring inserted between the handle portion and the machine. In such machines the mounting of the recoil damping springs in single or multiple arrangement and the guiding of the handle portion has hitherto usually resulted in considerable constructive complicity, in an undesireable increase of the length of the machine, or in looseness in the transmission of guiding forces from the handle portion to the machine to such an extent that the operator lost considerable time during work in placing the working end of the tool at the exact desired points of the working surface.

It is an object of the invention to provide an effectively recoil vibration damped percussive machine having a short constructive length and a rigid force transmission between the handle portion and the machine substantially free from looseness during sustaining of the machine in position. Another object of the invention is to provide in the above type of machines a well protected mounting of the damping spring or springs. It is a further object of the invention to create the constructive requirements in pressure fluid driven machines of the above type for making possible supply of pressure fluid to the machine via the handle portion so that part of the weight of the pressure fluid hose will be included in the mass of the damped system and the need for extra weights to be hanged-on onto the machine is reduced or eliminated.

For the above and other purposes there is according to the invention provided a recoil vibration damped percussive machine comprising a housing, an impact motor in said housing, opposed forward and rear bores in said housing spaced longitudinally thereof, at least one tube inserted with the opposite ends thereof in two of said opposed bores and axially slidably guided therein longitudinally of said housing, a recoil damping spring inserted in each said tube between the rear end portion thereof and the forward one of said bores receiving said tube for moving said tube rearwardly, and a handle portion fixed to each said tube between said opposed bores for sustaining the machine in position during work and for keeping said damping spring compressed by forward movement of said handle portion relative to said housing. The above defined bores provide sockets for taking up the tube guidingly and sealingly and the handle portion connected thereto practically without looseness whilst the spring is well protected within the tube.

The above and other objects of the invention will become obvious from the following description and from the accompanying drawings in which a preferred embodiment of the invention is illustrated by way of example. It should be understood that this embodiment is only illustrative of the invention and that various modifications thereof may be made within the scope of the claims.

In the drawings FIG. 1 shows a longitudinal section through a recoil damped percussive machine embodying the invention. FIG. 2 is a cross section viewed on the line 2—2 in FIG. 1. FIG. 3 is a fragmentary side view seen in the direction designated by the arrows on line 3—3 in FIG. 1. FIG. 4 finally is an enlarged fragmentary section of a lubricator included in the machine and also indicated in FIG. 1 in the backhead of the machine.

In the figures has been cosen by way of example a pressure fluid driven and, more particularly, compressed air driven breaking machine 10, the invention, however, not being limited to such machines but being applicable with manually sustained percussive machines of arbitrary type and with arbitrary driving means. In the cylinder housing 11 of the breaking machine 10 a hammer piston 12 is reciprocable under the action of pressure fluid which is supplied alternately to the ends of the cylinder housing 11 under the control of a distributing valve 13. The valve 13 is guided within a valve housing 14 mounted on a cover 15 at the upper end of cylinder housing 11 and is surrounded by the backhead 16 of the machine 10. The hammer piston delivers by its reduced shank portion impacts through an intermediate sleeve 17 against an anvil block 18 which is guided in the front head 19 of the machine. The front head 19 receives the shank portion of the breaking tool 20 and carries a conventional tool holder therefor, not shown. The cylinder housing 11 of the machine is tightened fast between the backhead 16 and the front head 19 by aid of a pair of side bolts 21, FIG. 3.

At is lower portion the cylinder housing 11 is provided at opposite sides thereof with bosses in which are made two parallel bores 22, 23. The lower ends thereof are closed by threaded plugs 24. Two bores 25, 26 of equal size with the bores 22, 23 are made in similar bosses in the backhead 16 coaxially with the bores 22, 23. In the coaxial bores 22, 26 are slidably guided the opposite end portions of a tube 27. In similar manner the end portions of a tube 28 are slidably guided in the coaxial bores 23, 25. The bores 22, 23, 25, 26 are sealed with respect to the tubes 27, 28 by suitable sealing rings. Within the tubes 27, 28 near the upper ends thereof there are provided inner shoulders 29, each of the tubes 27, 28 containing a damping spring 30, 31 inserted between the shoulder 29 and the respective bores 22, 23 and bearing against the plugs 24. The springs 30, 31 are inserted under pre-compression striving to move the tubes 27, 28 upwardly to abut against inner abutment means or shoulders 32 in the backhead 16.

The handle portion 33 of the breaking machine 10 includes a pair of handles 34, 35 of which the one, 34, forms part of a control valve housing 36. The latter is provided with a nipple 37 to which is connected a hose 38 for the supply of pressure fluid to the control valve housing 36. In the interior of the control valve housing 36 is provided a valve seat 39 against which a control valve 40 is movable by a closing spring 41. The stem 42 of the valve is extended upwardly through the control valve housing 36 to the inner end of the handle 34 and can be depressed at this point by a trigger 43. The control valve housing 36 is passed by the tube 28 and has a press fit thereagainst bearing furthermore against a thickened middle portion 44 on the tube. Radial bores 45 are provided in the tube 28 upwardly of the middle portion 44 and via these bores a supply passage 46 can communicate with the interior of the tube 28 and with supply passages 47 in the backhead 16 of the breaking machine 10 leading to the distributing valve 13. The backhead 16 is provided with a bore 49 through which the bore 25 communicates with the supply passage 47.

Downwardly of the other handle 35 the handle portion 33 has a sleeve 48 formed thereon which is passed by the other tube 27. The sleeve 48 bears against a middle portion 44 on the tube 27 and has a press fit thereagainst. The handle portion 33 includes furthermore a hinge 50, FIG. 2, the leafs 51 of which are fixed by screws each adjacent to one of the handles 34, 35. The pivot axis 52 of the hinge 50 is parallel with the tubes 27, 28.

In the backhead 16 there is disposed a lubricator 53 connected to an oil chamber 56 therein sealed by means of a plug. The lubricator 53 is provided with a spring loaded dispensing valve 54 which in conventional manner upon each repeated actuation of the trigger 43, as soon as line pressure is received in the machine 10, delivers a portion of oil into a bore 55, FIG. 4, communicating with the bore 26.

The breaking machine 10 is placed at the desired point and is sustained in position by the handles 34, 35 whereupon the trigger 43 is actuated. As a result thereof the valve 40 opens the passage 46 of the control valve housing 36 for pressure fluid flow from the hose 38. Pressure fluid flows via the bores 45, the tube 28, the bore 26, and the pressure fluid passage 47 to the distributing valve 13 and the hammer piston 12 begins to reciprocate. During work the operator exerts a suitable feeding pressure by depressing the handles 34, 35 whereby the damping springs 30, 31 are loaded or compressed. In connection herewith the operator guides in his hand besides the masses of the handle portion 33 and tubes 27, 28 also part of the mass of hose 38, which masses define the system being effectively damped in regard of vibration by the damping springs 30, 31. The characteristics of the springs are chosen in relation to the damped mass in such way that the damping will be optimal during the normal working frequencies of the impact motor.

Should the operator exert too small a feeding pressure against the handles 34, 35, the tubes 27, 28 will be moved upwardly by the damping springs 30, 31 against the shoulders 32 at which instant the vibration damping ceases. The strong vibrations in the handles 34, 35 will remind the operator to increase immediately the feeding force so that the handle portion 33 again will be damped in regard of recoil vibration by the springs 30, 31 and the machine 10 will not unnecessarily be subjected to idle blows.

In case of need one can be content with a single damping spring particularly in connection with light-weight percussive machines such as riveting hammers and coal picks. In such cases the handle portion 33 can be prevented from rotating for example by being provided with a guiding hole slidingly cooperating with one of the side bolts 21.

Thanks to the dispensing of an oil dose into the bore 26 each time the pressure is relieved in the machine 10 and the trigger 43 is again actuated, the spring 30 will receive an excellent lubrication so that the operable life thereof is increased and the wall friction in the tube 28 is reduced. Through the bore 49 pressure fluid with oil droplets suspended therein will be supplied to the interior of the tube 27, as well, so that damping spring 31 will be likewise kept well lubricated. Thanks to the equal diameters of the bores 22, 23, 25, 26, the tubes 27, 28, when supplied with pressure fluid, will be relieved from axial pressure fluid forces simultaneously with the force distribution being uniform at both sides of the machine 10 when the damping springs 30, 31 are used.

The division of the handle portion 33 into two parts pivoted to one another by means of the hinge 50 makes possible squeeze-free mounting of the tubes 27, 28 in the bores 22, 26 and 23, 25 without having to rely on close tolerances.

What we claim is:

1. A recoil vibration damped percussive machine comprising a housing, an impact motor in said housing, opposed bores in said housing spaced longitudinally thereor, a tube inserted with the opposite ends thereof in said spaced bores and axially slidably guided therein longitudinally of said housing, abutment means in one of said bores, a recoil damping spring inserted in said tube between one end portion thereof and said housing for moving said tube against said abutment means, and a handle portion fixed to said tube between said bores for sustaining the machine in position during work and for loading said damping spring by movement of said handle portion and tube away from said abutment means.

2. A machine according to claim 1 in which said impact motor is driven by pressure fluid, passage means for supplying pressure fluid to said impact motor, and the interior of said tube and said bores being in communication with said passage means for receiving pressure fluid therefrom.

3. A machine according to claim 2 in which said handle portion includes a control valve housing, a manually actuatable control valve in said valve housing, and said passage means extending from said valve housing to said impact motor via said tube.

4. A recoil vibration damped percussive machine comprising a housing, an impact motor in said housing, opposed forward and rear bores in said housing spaced longitudinally thereof, at least one tube inserted with the opposite ends thereof in two of said opposed bores and axially slidably guided therein longitudinally of said housing, a recoil damping spring inserted in each said tube between the rear end portion thereof and the forward one of said bores receiving said tube for moving said tube rearwardly, and a handle portion fixed to each said tube between said opposed bores for sustaining the machine in position during work and for keeping said damping spring compressed by forward movement of said handle portion relative to said housing.

5. A machine according to claim 4 in which there are provided shoulders in the rearward ones of said bores cooperating with the rear ends of said tubes for limiting rearward movement thereof under the action of said damping springs.

6. A recoil vibration damped percussive machine comprising a housing, an impact motor in said housing, two pairs of opposed bores in said housing spaced longitudinally thereof, a pair of tubes inserted with the opposite ends thereof each in one pair of said opposed bores and axially slidably guided therein longitudinally of said housing, a recoil damping spring inserted between the rear end portion of each said tube and the forward ones of said bores, and a handle portion fixed to both said tubes between said opposed bores for sustaining the machine in position during work and for keeping said damping springs compressed by forward movement of said handle portion and tubes relative to said housing.

7. A machine according to claim 6 in which said handle portion includes a hinge with the hinge axis thereof parallel with said tubes for dividing the handle portion into two parts pivoted to one another, each of said parts being connected to one of said tubes.

8. A machine according to claim 6 in which said impact motor is driven by pressure fluid, passage means for supplying pressure fluid to said impact motor, and the interior of said tubes and said bores being in communication with said passage means for receiving pressure fluid therefrom.

9. A machine according to claim 8 in which said handle portion includes a control valve housing, a manually actuatable control valve in said valve housing, and said passage means extending from said valve housing to said impact motor via one of said tubes.

10. A machine according to claim 8 in which all said bores are of equal diameter.

References Cited

UNITED STATES PATENTS

| | | | |
|---|---|---|---|
| 527,078 | 10/1894 | Ross | 173—162 X |
| 1,578,434 | 3/1926 | Hansen | 173—162 X |
| 1,820,185 | 8/1931 | Gartin | 173—162 X |
| 1,902,530 | 3/1933 | Terry | 173—162 X |
| 3,010,431 | 11/1961 | Holdo | 173—162 |

ERNEST R. PURSER, *Primary Examiner.*

U.S. Cl. X.R.

16—116; 173—139